Nov. 6, 1962   A. S. ANDRESEN ET AL   3,062,568
SAFETY SCREW THREAD ARRANGEMENT
Filed Oct. 20, 1959   3 Sheets-Sheet 1

INVENTORS
Alf S. Andresen
Julius Beck
Richard R. Gearing
By: Munn N Kane
Atty.

INVENTORS
Alf S. Andresen
Julius Beck
Richard R. Gearing
By: Munn Whare
Atty.

United States Patent Office 3,062,568
Patented Nov. 6, 1962

3,062,568
SAFETY SCREW THREAD ARRANGEMENT
Alf S. Andresen, Richard R. Gearing, and Julius S. Beck, all of 2626 Cherry Ave., Long Beach, Calif.
Filed Oct. 20, 1959, Ser. No. 847,508
3 Claims. (Cl. 285—333)

This invention relates to new and useful improvements in screw threads, and the principal object of the invention is to provide an improved screw thread arrangement wherein the lead of the thread is separate from the screw and the nut and wherein various different means may be utilized to operatively connect the screw, the nut and the separate lead together so as to selectively produce a non-locking, unlocking, or a locking screw thread joint.

As such, the invention is particularly well adapted for use in connecting together the pin and box ends of tubing of relatively large diameter such as is used in oil wells, although it is to be understood that the use of the invention is not limited to this particular environment and that the same may be utilized in screws and nuts of any diameter, with straight, tapered and/or multiple threads.

Various advantages and features of the invention will be apparent from the following description taken in conjunction with the accompanying drawings, wherein like characters of reference are used to designate like parts, and wherein for illustrative purposes:

Figure 1:
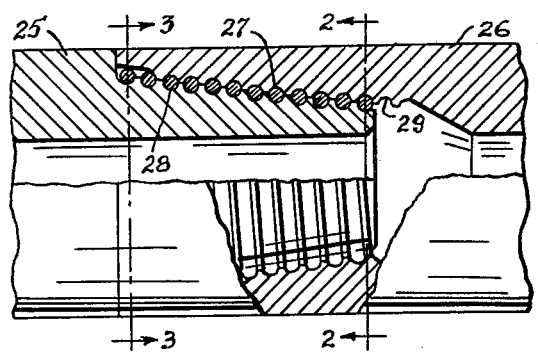
FIGURE 1 is a fragmentary view, partly in elevation and partly in longitudinal section, showing the components of the invention assembled in a non-locking joint.

Referring now to the accompanying drawings in detail, more particularly to FIGURES 1-11 inclusive, the reference numeral 25 designates the body of a screw, or the "pin" or male end portion of casing or tubing to be connected, while the numeral 26 designates the body of a nut, or the "box" or female end portion of such casing or tubing. The numeral 27 indicates the lead which is formed separately from the screw 25 and nut 26, but serves to operatively connect the same together into a screw-threaded joint assembly.

Figure 7:
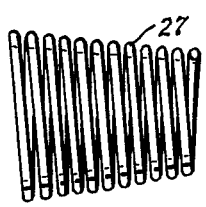
FIGURE 7 is an elevational view of the lead per se.
Figure 8:
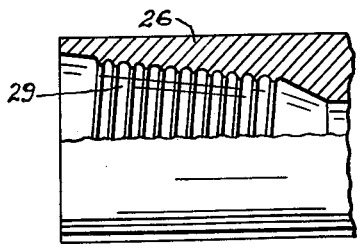
FIGURE 8 is a fragmentary view, partly in elevation and partly in longitudinal section, of the nut per se.

In the instance illustrated, the screw thread is of a simple, tapered form, and the lead 27 is in the form of a tapered helix, as is best shown in FIGURE 7. The material from which this helix is formed may be of a circular, elliptical, polygonal or any other suitable cross-section, including conventional thread profiles, et cetera. In any event, the body of the screw 25 is provided with a spiral groove 28 and the body of the nut 26 is similarly provided with a spiral groove 29, the grooves 28 and 29 being complemental to and receiving therein the lead 27 when the parts are assembled as shown.

Figure 2:
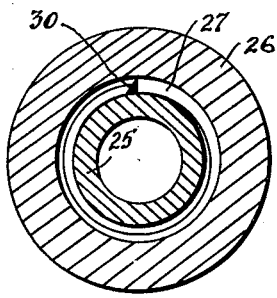
FIGURE 2 is a cross-sectional view, taken substantially in the plane of the line 2—2 in FIGURE 1 and showing one form of means for securing the lead end to the screw body.
Figure 3:
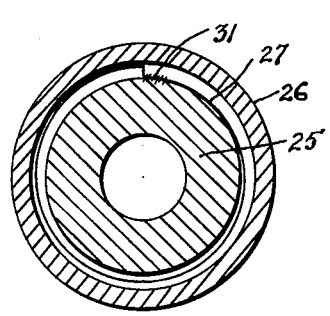
FIGURE 3 is a cross-sectional view, taken substantially in the plane of the line 3—3 in FIGURE 1 but showing another form of means for securing the lead end to the screw.
Figure 5:
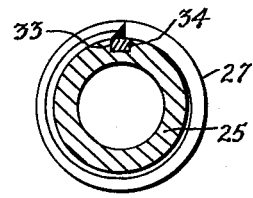
FIGURE 5 is a cross-sectional view of the screw and lead only, showing another form of means for securing the lead to the screw.
Figure 6:
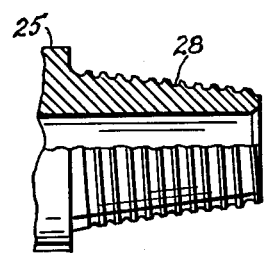
FIGURE 6 is a fragmentary view, partly in elevation and partly in longitudinal section, of the screw per se.
Figure 11:
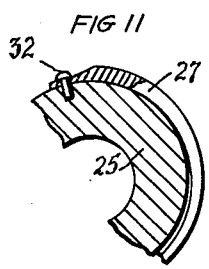
FIGURE 11 is a fragmentary cross-sectional view showing another form of means for securing the lead to the screw.

If the joint desired is to be of a non-locking type, that is, of a type which may be screwed together and unscrewed at will, both ends of the lead 27 are secured to the body of the screw 25 by any one of a variety of different securing means now to be described. One of such means is shown in FIGURE 2, wherein the end of the lead is secured in the groove 28 of the screw 25 by spot welding indicated at 30. Alternatively, it may be secured by fusion welding as indicated at 31 in FIGURE 3. Or, as illustrated in FIGURE 11, the end portion of the lead may be flattened and secured to the screw by a suitable fastening element such as a pin or rivet 32. Also, as shown in FIGURE 5, the end of the lead may be welded or otherwise secured to a plug or a key 33, inserted into a socket or recess 34 in the screw body. Such a plug or key may be of the same material as the lead to facilitate welding, and a slightly modified form of the plug or key is illustrated at 33′ in FIGURES 9 and 10, it being apparent that, upon disassembly of the joint, the plugs or keys 33, 33′ may be readily removed from the screw body to permit convenient removal and replacement of the lead, when so desired. In any event, in the non-locking type of joint, both ends of the lead helix 27 are secured to the screw as already noted, whereby the lead becomes a part of the screw and permits the screw and the nut to be assembled and separated as desired.

It may be noted at this point that although the various illustrated forms of the securing means have been described as securing the ends of the lead to the screw, the arrangement may be reversed, if desired, so that such securing means anchor the lead in the groove 29 of the nut 26. This however, may be somewhat difficult from the standpoint of accessibility, where the thread of the nut is of a relatively small diameter.

Figure 4:
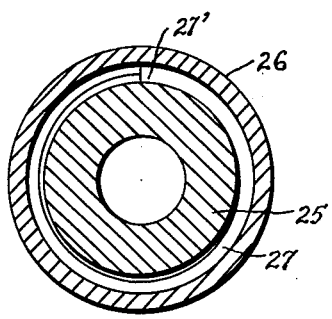
FIGURE 4 is a cross-sectional view, similar to that shown in FIGURE 3 but illustrating a locking joint wherein the lead end is unsecured.

In instances where the joint to be formed is to be of a locking type, that is, of a type which, after assembly, cannot be readily separated, only one end of the lead 27 is secured to the screw 25 (on nut 26), while the other end of the lead is left free in the grooves 28, 29, as indicated at 27' in FIGURE 4. In such an arrangement, any attempt to unscrew the male and female components of the joint causes the lead to expand and lock the joint against separation.

Referring now to the accompanying FIGURES 12–16 inclusive, the lead receiving groove 28 on the screw body 25a herein is arranged so as to provide a land 35 on the screw body which is free or devoid of the groove, and is adapted to accommodate a collar 36. The latter is provided with an internal groove 37 to receive an end portion of the lead 27 when the parts are assembled and the collar is disposed between an annular shoulder 38 on the screw and the adjacent end of the nut 26a. One end of the lead 27 is secured in the groove 37 of the collar 36 while the other end of the lead is secured in the groove 28 of the screw 25a and the joint, which is normally locked against separation by the tendency of the lead to expand during unscrewing, may be unlocked and separated by simply holding the collar 36 stationary on the screw 25a during unscrewing, so as to prevent expansion of the lead.

Figure 17:
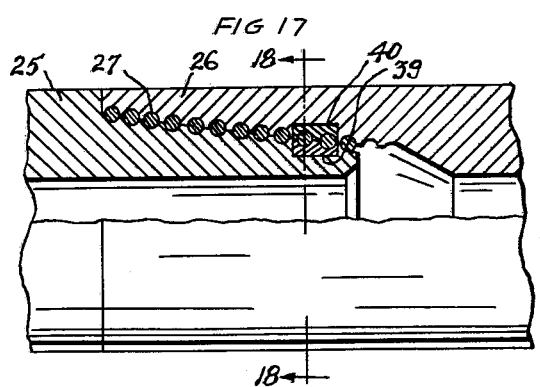
FIGURE 17 is a fragmentary view, partly in elevation and partly in longitudinal section, of a modified form of joint embodying sealing means.
Figure 18:
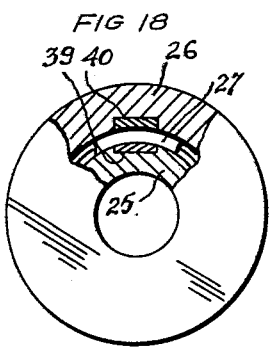
FIGURE 18 is a cross-sectional view, taken substantially in the plane of the line 18—18 in FIGURE 17.
Figure 19:
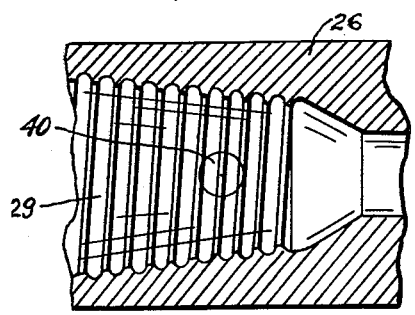
FIGURE 19 is a longitudinal sectional view in fragmentary form, showing the sealing means at the inside of the nut illustrated in FIGURE 17.

The accompanying FIGURES 17–19 inclusive illustrate an embodiment of the invention which is provided with sealing means to safeguard against leakage at the joint under high pressures. Such sealing means comprise a pair of mutually opposed inserts 39, 40 which are provided in suitable recesses or sockets formed in the screw 25 and nut 26, respectively, so that these inserts are traversed by the grooves 28, 29 and embrace the lead 27 at least at one point along its helical length. The inserts 39, 40 are formed from suitable material such as rubber, neoprene, Teflon, or the like, and their engagement with the lead 27 effectively prevents leakage past the screw thread.

Figure 20:
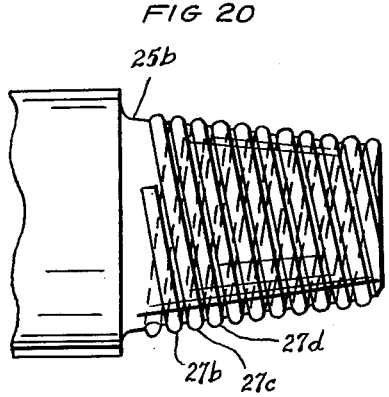
FIGURE 20 is a fragmentary elevational view of a screw and leads embodying multiple, tapered threads.
Figure 21:
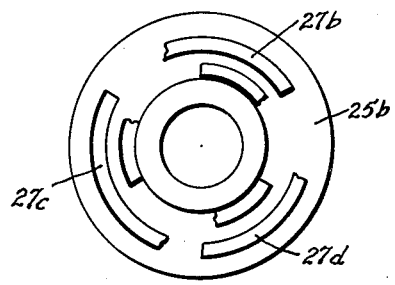
FIGURE 21 is an end view of the device shown in FIGURE 20 with the leads partially broken away.

FIGURES 20 and 21 exemplify an application of the teachings of the invention to multiple, tapered threads, wherein multiple leads 27b, 27c, 27d are provided in interfitting relation on the body of the screw 25b.

Figure 22:
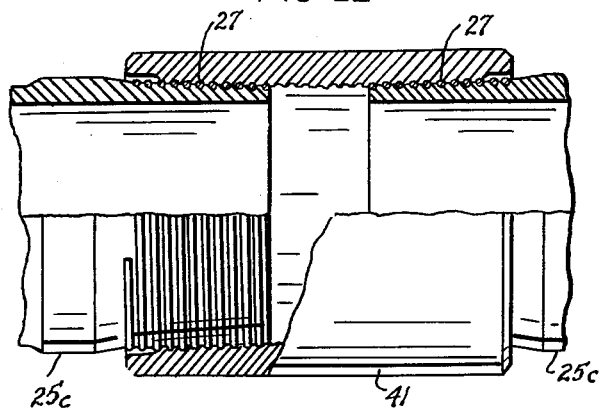
FIGURE 22 is a fragmentary view, partly in elevation and partly in longitudinal section, showing the invention as adapted to tubing or casing connections.

FIGURE 22 illustrates the use of the invention in a joint for tubes or conduits 25c which, in this instance, both constitute the male members of the joint and are connected together by a tubular coupling or sleeve 41 constituting the female part, with the leads 27 cooperating therewith as already described.

Figure 23:
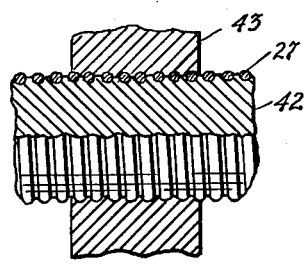
FIGURE 23 is a fragmentary view, partly in elevation and partly in longitudinal section, showing the invention adapted to straight threads.

Finally, FIGURE 23 shows the use of the invention in a straight thread, wherein the lead 27 cooperates with a screw 42 and a nut 43.

In connection with all the disclosed embodiments of the invention it may be noted that joints are provided which have superior stress characteristics as compared with conventional screw threads, which facilitate use of sealing means under high pressures without requiring abutting shoulders or the use of dope, and wherein the thread lead may be formed from different material than the screw and nut, either harder or softer as desired, and/or heat treated or otherwise adapted for its intended purpose.

Figure 9:
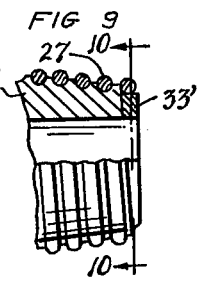
FIGURE 9 is a fragmentary view, partly in elevation and partly in longitudinal section, showing another form of means for securing the lead to the screw.
Figure 10:
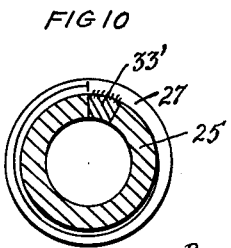
FIGURE 10 is a cross-sectional view, taken substantially in the plane of the line 10—10 in FIGURE 9.
Figure 12:
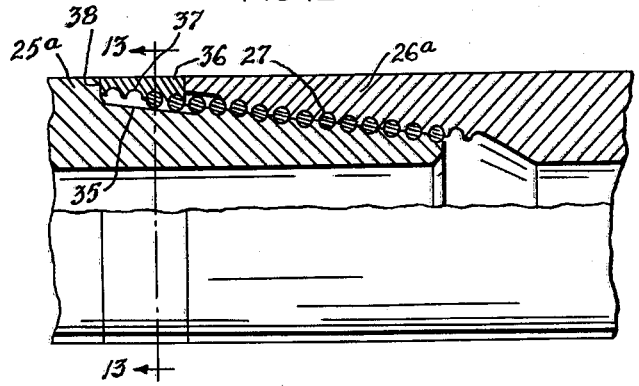
FIGURE 12 is a fragmentary view, partly in elevation and partly in longitudinal section, showing a locking type joint which is adapted for convenient unlocking.
Figure 13:
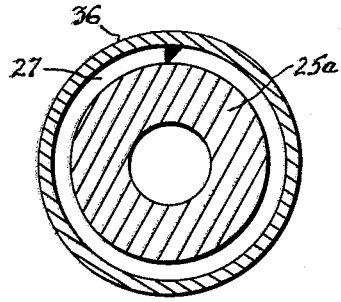
FIG. 13 is a cross-sectional view, taken substantially in the plane of the line 13—13 in FIGURE 12.
Figure 14:
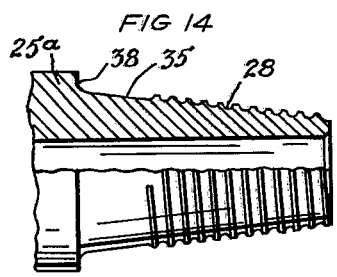
FIGURE 14 is a fragmentary view, partly in elevation and partly in longitudinal section, of the screw used in FIGURE 12.
Figure 15:
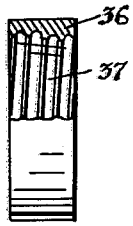
FIGURE 15 is a fragmentary view, partly in elevation and partly in section, of the collar used in FIGURE 12.
Figure 16:
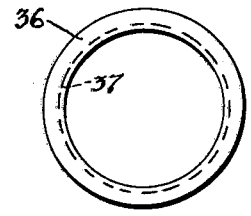
FIGURE 16 is an end view of the collar shown in FIGURE 15.

Also, the thread lead, particularly when secured with the use of plugs or keys as shown in FIGURES 5 and 9, may be quickly and easily replaced in the event of wear or other damage, and the locking types of joints illustrated in FIGURES 4 and 12 effectively safeguard against separation by vibration or other causes, without requiring the use of separate locking means.

While in the foregoing there have been described and shown various modified embodiments of the invention, other modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a screw type joint, the combination of a male member having an annular shoulder and an outer surface provided with a helical groove and with a grooveless land between said groove and said shoulder, a female member having an end edge and an inner surface provided with a helical groove complemental to the groove of said male member when the members are interfitted, a helical thread lead formed separate from said members and disposed in the complemental grooves thereof with one end portion of the thread lead extending over said land, and an annular collar rotatably positioned on said land and provided with an internal helical groove receiving said one end portion of said lead, said one end portion of the lead being secured to said collar and the other end of the lead being secured to one of said members.

2. The device as defined in claim 1 wherein said collar is in rotatable abutment with said shoulder of said male member and with said end edge of the female member.

3. In a screw type joint, the combination of interfitted male and female members having outer and inner surfaces respectively provided with complemental helical grooves, a helical thread lead formed separate from said members and disposed in said grooves, and a collar rotatably positioned on the male member at one end thereof and having one end of the thread lead secured thereto, the other end of said lead being secured to one of said members at the end opposite said collar whereby the collar may coact with the other member to prevent expansion and facilitate unlocking of the lead during separation of said members.

References Cited in the file of this patent

UNITED STATES PATENTS

| | | |
|---|---|---|
| 534,164 | Larsh | Feb. 12, 1895 |
| 1,456,177 | Crockett | May 22, 1923 |
| 2,418,418 | Martin | Apr. 1, 1947 |
| 2,469,074 | Mueller | May 3, 1949 |
| 2,631,871 | Stone | Mar. 17, 1953 |
| 2,816,782 | Anderson | Dec. 17, 1957 |